(12) United States Patent
Miotto et al.

(10) Patent No.: US 8,273,151 B2
(45) Date of Patent: Sep. 25, 2012

(54) HORIZONTAL LIQUID/GAS SEPARATION DEVICE, AND SEPARATION METHOD, IN PARTICULAR FOR THE LIQUID AND GASEOUS PHASES OF A CRUDE OIL

(75) Inventors: Giorgio Miotto, Milan (IT); Massimo Chiarotti, San Donato Milanese (IT)

(73) Assignee: Saipem S.A., Montigny le Bretonneux (FR)

( * ) Notice: Subject to any disclaimer, the term of this patent is extended or adjusted under 35 U.S.C. 154(b) by 252 days.

(21) Appl. No.: 12/682,206

(22) PCT Filed: Sep. 24, 2008

(86) PCT No.: PCT/FR2008/051702
§ 371 (c)(1),
(2), (4) Date: Apr. 8, 2010

(87) PCT Pub. No.: WO2009/050367
PCT Pub. Date: Apr. 23, 2009

(65) Prior Publication Data
US 2010/0212492 A1  Aug. 26, 2010

(30) Foreign Application Priority Data
Oct. 9, 2007 (FR) ..................................... 07 58164

(51) Int. Cl.
*B01D 19/00* (2006.01)
(52) U.S. Cl. .................. 95/24; 96/182; 96/204; 96/209; 96/157; 96/184; 95/253; 95/260; 166/357
(58) Field of Classification Search ..................... 95/253, 95/260, 24; 96/182, 204, 209, 157, 184; 166/357; 210/537
See application file for complete search history.

(56) References Cited

U.S. PATENT DOCUMENTS

| | | | | |
|---|---|---|---|---|
| 1,467,512 | A * | 9/1923 | Starke | 96/204 |
| 1,559,115 | A * | 10/1925 | Marker et al. | 96/184 |
| 7,901,492 | B2 * | 3/2011 | Gramme et al. | 96/182 |
| 2010/0180769 | A1 | 7/2010 | Grenstad et al. | 95/260 |
| 2011/0072975 | A1 * | 3/2011 | Aarebrot et al. | 96/157 |

FOREIGN PATENT DOCUMENTS

| | | |
|---|---|---|
| EP | 1352679 | 10/2003 |
| EP | 1352679 A1 * | 10/2003 |
| RU | 2134607 | 8/1999 |
| RU | 2134607 C1 * | 8/1999 |

(Continued)

OTHER PUBLICATIONS

International Search Report dated Jun. 30, 2009.
English Translation of the Written Opinion of the International Searching Authority dated May 11, 2010.

*Primary Examiner* — Duane Smith
*Assistant Examiner* — Douglas Theisen
(74) *Attorney, Agent, or Firm* — Cozen O'Connor

(57) ABSTRACT

A liquid/gas separator device for separating liquid and gaseous phases of a fluid, in particular crude oil, the device comprising a network of first and second separator pipes disposed horizontally, said first and second separator pipes being connected together by vertical link third pipes. The first separator pipes are fed from and connected upstream to a horizontal cylindrical diffuser and are connected downstream to a first horizontal cylindrical manifold. The second separator pipes are connected upstream to the same diffuser and downstream to a second horizontal cylindrical manifold.

18 Claims, 6 Drawing Sheets

FOREIGN PATENT DOCUMENTS

| | | | |
|---|---|---|---|
| SU | 969282 | * | 10/1982 |
| SU | 969282 | A1 | 10/1982 |
| WO | WO 2006/058000 | | 6/2006 |
| WO | WO 2006058000 | A1 * | 6/2006 |
| WO | WO 2007/071664 | | 6/2007 |
| WO | WO 2007071664 | A1 * | 6/2007 |

* cited by examiner

HORIZONTAL LIQUID/GAS SEPARATION DEVICE, AND SEPARATION METHOD, IN PARTICULAR FOR THE LIQUID AND GASEOUS PHASES OF A CRUDE OIL

PRIORITY CLAIM

This is a U.S. national stage of application No. PCT/FR2008/051702, filed on Sep. 24, 2008. Priority is claimed on the following application: France application Ser. No. 07/58164 Filed on Oct. 9, 2007, the content of which is incorporated here by reference.

FIELD OF THE INVENTION

The present invention relates to a liquid/gas separator device of the horizontal type and to a method of separating a polyphase fluid, in particular the oil/water and the gas contained in crude oil.

The technical field of the invention is more particularly the field of oil production, and more particularly the field of off-shore oil wells at great depth.

BACKGROUND OF THE INVENTION

In general, oil is produced off-shore in deep water from a floating support that is anchored near to oil wells that are situated at the sea bottom, i.e. at depths that may lie in the range 1000 meters (m) to 2500 m, or even more. The floating support generally includes anchor means enabling it to remain in position in spite of the effects of current, wind, and swell. It generally also includes means for storing and processing oil and means for off-loading to off-loading tankers, which tankers call at regular intervals to off-load the production. Such floating supports are commonly referred to as floating production storage off-loading, commonly abbreviated to "FPSO", which abbreviation is used throughout the description below.

Well heads are generally connected to such an FPSO via undersea pipes of the suspended catenary riser (SCR) type or of the hybrid tower type comprising:

a vertical riser having its bottom end anchored to the sea bottom and connected to a said pipe resting on the sea bottom, and having its top end tensioned by a float submerged in the subsurface and to which it is connected; and a link pipe, generally a flexible link pipe extending between the top end of said riser and a floating support on the surface, said flexible link pipe taking up, where appropriate and under its own weight, the shape of a dipping catenary curve, i.e. going well below the float before rising up to the floating support.

The entire production of crude oil is thus generally raised on board the FPSO where it is processed in order to separate the oil proper from the water, the gas, and possible sandy components. Once separated, the oil is then stored on board, the gas is washed and then delivered to gas turbines for producing the electricity and the heat needed on board, with any surplus being reinjected into the reservoir of the oil field so as to restore pressure in said reservoir. After being released of a sand in suspension, the water is finally rejected into the sea after thorough extraction of all particles of oil, or else it is likewise reinjected into the reservoir, with additional sea water taken from below the surface generally being added in order to achieve the flow rate required for injecting water into the reservoir. The extracted sand which is present in minute quantities only, is finally washed and then rejected into the sea.

A known method of separating the gas, water, and oil in crude oil that is commonly used in installations on land consist in using tanks of very large volumes, generally in the form of elongate cylinders, with the crude oil entering via one end and traveling along said tank for a duration of the order of 5 minutes (min) to 10 min, during which the various phases separate naturally under gravity before reaching the second end. The gas is then recovered from the top of the tank, the water and the sand from the bottom, and the oil from an intermediate portion. A very wide variety of separators of that type are in existence and they generally incorporate additional internal devices such as horizontal, vertical, or sloping screens, for the purpose of facilitating separation between the phases and preventing them from remixing at a subsequent stage.

Those separators operate at low pressure, e.g. 3 bars to 10 bars, and sometimes even at less than atmospheric pressure, in order to optimize the degassing of the crude oil. If it is desired to install that type of separator on the sea bottom, the tank must be capable of withstanding implosion under the effect of pressure that is substantially 100 bars, i.e. substantially 10 megapascals (MPa), per 1000 m of water depth. Thus, transposing such a tank for use at great or very great depth would require wall thicknesses of 100 millimeters (mm) to 150 mm in order to withstand implosion, and such sheet-metal work items would be very difficult and expensive to make and to install at great depths on the sea bottom.

SUMMARY OF THE INVENTION

An object of the present invention is to provide an improved undersea gas/liquid separator device suitable for being installed and for operating on the sea bottom at great depth, in particular at depths of at least 1000 m, that is simple and less expensive to make, install, and operate on the sea bottom.

For this purpose, in a first aspect, the present invention provides a liquid/gas separator device for separating the liquid and gaseous phases of a fluid, in particular the liquid and gaseous phases of crude oil, the device comprising a structure resting on the sea bottom and supporting:

a) at least one and preferably a plurality of first separator pipes extending from a horizontally-extending cylindrical first diffuser tank of elongate shape and circular section, the test separator pipes being connected thereto at their upstream ends, said first tank preferably being of diameter greater than the diameter of said first separator pipes, said first separator pipes being inclined at an angle $\alpha$ lying in the range 1° to 5° relative to the horizontal with a gentle downward slope from said first tank towards a substantially horizontal first cylindrical manifold to which said first pipes are connected downstream, said first diffuser tank being fed by at least one fluid feed pipe, and said first manifold being connected to at least one first liquid evacuation pipe of downward slope, and preferably including downstream an export pump suitable for drawing said degassed liquid from said first manifold; and b) at least one and preferably a plurality of second separator pipes disposed above said first pipes, extending from and above said first tank with a gentle rising slope from said first tank towards a substantially horizontal second cylindrical manifold, said second separator pipes being inclined relative to the horizontal at an angle $\beta$ greater than $\alpha$, preferably less than 10°, said second manifold preferably being of diameter greater than the diameter of said second pipes and smaller than the diameter of said first tank, said second manifold being connected to at least one first gas evacuation pipe, preferably of slope rising from said second manifold to the end of a second gas evacuation pipe, said first gas evacuation pipe being inclined at an angle γ that is greater than α, and preferably less than 10°; and c) a plurality of vertical link third pipes between each said first separator pipe and each said second separator pipe; and d) a system of preferably hydraulic actuators enabling the inclination of said first and second separator pipes to be adjusted accurately and enabling said first tank and said first and second manifolds to be positioned horizontally.

It can thus be understood that said first and second separator pipes are mounted on said first tank and said first and second manifolds so as to present a given gentle inclination relative to a horizontal plane, whereas said first tank and said first and second manifolds have their own axes placed horizontally.

The inclination of said first separator pipes relative to said second separator pipes is constant (β+α=a constant); because said first and second pipes slope in opposite directions relative to the horizontal, reducing the inclination of the first pipes increases the inclination of the second pipes and vice versa, since α and β vary in opposite directions. Likewise, the inclination of said first gas evacuation pipe relative to the first and second separator pipes is constant, and the inclination γ of said first gas evacuation pipes relative to the horizontal varies in the same direction as the inclination of said first separator pipes.

In a second aspect, the present invention provides a method of separating the liquid and gaseous phases of a fluid by means of an undersea separator device of the invention, wherein the following steps are performed:

1) sending the fluid, preferably crude oil, via a fluid feed pipe to said first tank; and 2) allowing the at least partially degassed liquid to flow from said first tank via said first separator pipe in order to be further degassed and to move down towards said first manifold, and then to said first liquid evacuation pipe; and 3) allowing the gaseous phase, possibly still containing liquid, to rise and flow from said first tank, via said second separator pipes towards said second manifold, and then towards said first gas evacuation pipe in order to allow additional separation of any residual liquid still contained in the gaseous phase prior to being evacuated via said second evacuation pipe; and 4) allowing the gas phase from the first separator pipe to rise through said vertical link third pipes and flow via said second separator pipes towards said second manifold and then towards said first and second gas evacuation pipes; and 5) allowing the liquid coming from gas separation in said second separator pipes, said second manifold, and said first gas evacuation pipe to flow towards said first manifold, where appropriate by passing via said first tank or said vertical link third pipes prior to rejoining said first liquid evacuation pipe; and 6) recovering the substantially degassed liquid phase from the bottom end of said first liquid evacuation pipe and taking it via a said second liquid evacuation pipe that is taken to the surface or sent to a liquid separator device in order to separate the different liquids possibly contained therein, preferably in order to separate the water and the oil of degassed oil, and where appropriate any remaining gas still present in imperfectly degassed crude oil; and 7) recovering the gas phase substantially separated from said liquid from the bottom end of said second gas evacuation pipe and preferably sending it to the surface or into a well for injecting gas into the sea bottom via a said third gas evacuation pipe.

It can be understood that the stream of crude oil filling the first tank allows first degassing to take place in said first tank. Thereafter, the partially-degassed fluid flowing inside the first pipe and the first manifold allow additional degassing to take place.

Subdividing the fluid stream from said first tank amongst the plurality of said first pipes for the liquid phase and the plurality of said second pipes for the gas phase allows fluid separation to be finished off since the flow takes place at a low speed and at a low rate, with a larger contact area in said first and second pipes, thereby enhancing separation.

It can be understood that the gentle slope of said first and second separator pipes and of said second evacuation pipe serves to slow down the flow of fluid so as to enhance degassing of the fluid and to slow down the flow of gas so as to enhance condensation, thereby separating out any liquid the gas may still contain. In particular, the slopes of said first and second separator pipes allow the partially-degassed fluid to flow slowly towards the first manifold and the condensed fluid coming from the gas to flow slowly towards the first tank, the upward slope of the gas evacuation pipe enabling the fluid that comes from the gas flowing therein to drop out in the second manifold and then into the first tank or the first manifold via said vertical link third pipes, and then via the second separator pipes so as to end up in the first liquid evacuation pipe.

Accurately adjusting the horizontality of said first tank and of said first and second manifolds serves to distribute the crude oil coming from the first diffuser tank in substantially uniform manner between the various first pipes. Furthermore, accurately adjusting the inclination of said first separator pipe enables the separation yield of said separator to be optimized as a function of the physico-chemical characteristics of the incoming crude oil. Highly viscous oil needs a steep slope for said first pipe, whereas low viscosity oil needs a slope that is gentle or even very gentle so that the oil advances more slowly in said first pipes and can thus remain therein long enough in the active zone for degassing as constituted by the first manifold, by the first pipes, and by the second manifold. The viscosity of the oil to be processed depends, amongst other things, on its composition and/or on the percentage of gas and/or oil it contains, and it can therefore vary over time. In particular, viscosity may decrease if water contents increase, as generally happens over time. A decrease in viscosity requires a decrease in the inclination of the first separator pipes and of the first gas evacuation pipes and a corresponding increase in the inclination of the second separator pipes, and vice versa.

Said tank and said cylindrical manifolds are more precisely and preferably of the cigar type, having a main portion that is cylindrical with ends in the form of partial spherical caps so as to be capable of withstanding well the pressure of the ambient medium that is substantially 100 bars, i.e. 10 Mpa, for every 1000 m of depth of water.

Preferably, said second separator pipes are connected upstream to said first tank via a respective plurality of second link pipes of slope that is greater than the slope of said second separator pipes and that is preferably substantially vertical.

Also preferably, said first tank and said first and second manifolds are substantially parallel, and said first and second separator pipes extend substantially in the same direction that is substantially perpendicular to the longitudinal direction of said first tank and said first and second manifolds.

Advantageously, the device of the invention includes flow rate control devices downstream from said first tank at the upstream ends of said first separator pipes, said devices controlling the flow rate of fluid transfer by head loss, preferably being of the cyclone type having tangential inlets substantially perpendicular to the axial direction of said first separator pipes, and axial outlets substantially on the axis of said first pipes.

This configuration for the link between said first tank and said first pipes serves to attenuate any disturbances in the fluid flow rate and to enhance separation of the residual gas within said second tanks.

More particularly, these devices for controlling transfer flow rate by head loss serve to attenuate and make uniform the flows of fluid within the various said first pipes, in spite of disturbance from unstable conditions that can result from bubbles or pockets of gas bursting when they degas from said crude fluid inside said first tank.

Advantageously, the device includes a structure constituted by a frame of beams supporting said first and second pipes, said first tank, and said first and second manifolds, said structure comprising:
  at least a first vertical pillar having a first frame at its bottom end, the first frame supporting portions of automatic connectors connected to said fluid feed pipe, to said first fluid evacuation pipe, and to said second gas evacuation pipe, said frame being suitable for co-operating in fastening with and on a first base anchored to the sea bottom; and
  at least two second vertical pillars each fitted at its bottom end with a preferably hydraulic actuator, the at least two actuators being suitable for co-operating with second bases anchored to the sea bottom and supporting them, said second pillars being disposed in such a manner as to enable the inclination of said first and second separator pipes and of said first gas evacuation pipe and said first liquid evacuation pipe to be adjusted and varied by actuating said actuators.

This structure may be lowered from the surface to the sea bottom by using cables.

Also advantageously, the separator device of the invention is installed at the sea bottom and includes a fluid delivery pipe providing a connection between at least one head of an oil well and said fluid feed pipe connected to said first tank at its other end, and including a pressure-reducer device and preferably a fluid flow rate control valve upstream from said delivery pipe for said fluid.

In the method of the invention, said crude oil at the bottom end of said first tank is sent at a reduced pressure P1, less than the static pressure P2 at the sea bottom, preferably such that the pressure difference $\Delta P = P1 - P0$, where P0 is the pressure at the surface, is greater than the head losses in the second gas evacuation pipes from the sea bottom to the surface. This enables the gas to be raised to the surface without additional equipment and/or without supplying additional external energy, and in particular without using a compressor.

Also advantageously, the delivery flow rate of the crude fluid is controlled upstream from said first tank by said flow rate control valve, and/or the evacuation flow rate of the degassed fluid is controlled downstream from said first manifold by the speed of said export pump as a function of measurements from at least one device for monitoring the level of the fluid within at least said first manifold.

A level monitoring device, e.g. constituted by a radar or sonar type probe, serves to ensure that the level of fluid inside said first tank and/or said first manifold preserves sufficient empty volume to allow gas to separate.

Preferably, said liquid/gas separator device is connected to a first base anchored to the sea bottom, said first base preferably being anchored to the sea bottom by a first suction anchor, said first base supporting a series of male or female portions of automatic connectors respectively at the ends of said first fluid delivery pipe, of a second degassed liquid evacuation pipe, and of a third gas evacuation pipe, co-operating with the complementary female or male portions respectively of the automatic connectors connected to said second fluid feed pipe, to said first liquid evacuation pipe, and to said gas evacuation pipe, similar additional connectors preferably conveying information or power between the module constituted by said separator device and the surface.

Also preferably, said second fluid evacuation pipe co-operates with a said export pump inserted in a well buried in the sea bottom beside said suction anchor of said first base, said pump preferably being installed several meters below said first base, more preferably said well being secured to said suction anchor in order to be evacuated to the surface.

In a particular embodiment, the liquid from the degassed fluid is exported from the sea bottom to the surface by using a so-called "export" pump.

More particularly, said separator device is installed at the sea bottom at a depth lying in the range 100 m to 4000 m and a pressure P2 lying in the range 10 bars to 50 bars, and preferably equal to 20 bars ($20 \times 10^5$ pascals (Pa)), is established within said first tank and said first and second manifolds, and said first and second separator pipes and said link third pipes, by lowering the pressure by using a pressure-reducer device co-operating with said crude fluid delivery pipe upstream from said first tank.

Advantageously, said first tank, said first and second manifolds, and said first, second, and third pipes are thermally insulated by a common rigid thermal-insulation enclosure filled with sea water and in communication with the sea via at least one communication orifice, preferably the wall of said enclosure including syntactic foam or thermal lagging protected by a rigid support made of metal or of composite material, more preferably including a heater device for heating sea water inside the enclosure, said communication orifice and said heater device more preferably being in the bottom portion of the enclosure.

This embodiment enables the fluid of the crude oil to be maintained at the high temperature lying in the range 50° C. to 70° C. at which it leaves the well head, thereby making it easier to raise the fluid to the surface, by avoiding paraffins solidifying and gas hydrates forming as a result of the crude oil cooling down to a temperature below 30° C. to 35° C.

In a particular embodiment, the separator device of the invention comprises:
  pluralities of 3 to 20 and preferably 4 to 12 of said first and second separator pipes and respectively of said link third pipes, preferably regularly distributed along the first tank (for the first pipes), the first and second manifolds (for the second pipes), and respectively said first and second separator pipes (for the link third pipes), the number of said first separator pipes preferably being greater than or equal to the number of said second separator pipes; and
  a single said fluid feed pipe, a single said first liquid evacuation pipe, and a single said first gas evacuation pipe.

In a particular embodiment, said first and second separator pipes present a length lying in the range 5 m to 50 m, preferably in the range 10 m to 20 m, and said third pipes present a length lying in the range 1 m to 5 m.

Finally, the present invention provides a method of installing a separator device on the sea bottom, the method being characterized in that the following steps are performed:

a) lowering a said separator device from the surface and placing it on the sea bottom; and b) adjusting the horizontality of said first tank and of said first and second manifolds, and the inclination of said first and second separator pipes by actuating said system of actuators.

More particularly, when said separator device includes a said support structure with three said first and second pillars and said actuators, the following steps are performed:

a) said separator device is lowered from the surface and placed on three bases constituted by three suction anchors buried in the sea bottom; then b) the horizontality of the axes of said first diffuser tank and of said first and second manifolds are adjusted relative to the horizontal by actuating at least one of the actuators by means of a remotely operated underwater vehicle (ROV); then c) the inclinations of said first and second separator pipes are adjusted by actuating the rods of two actuators by the same amount in the same direction.

BRIEF DESCRIPTION OF THE DRAWINGS

Other characteristics and advantages of the present invention appear in the light of the following detailed description of embodiments given with reference to FIGS. 1 to 4.

DETAILED DESCRIPTION OF THE PRESENTLY PREFERRED EMBODIMENTS

Figure 1A:
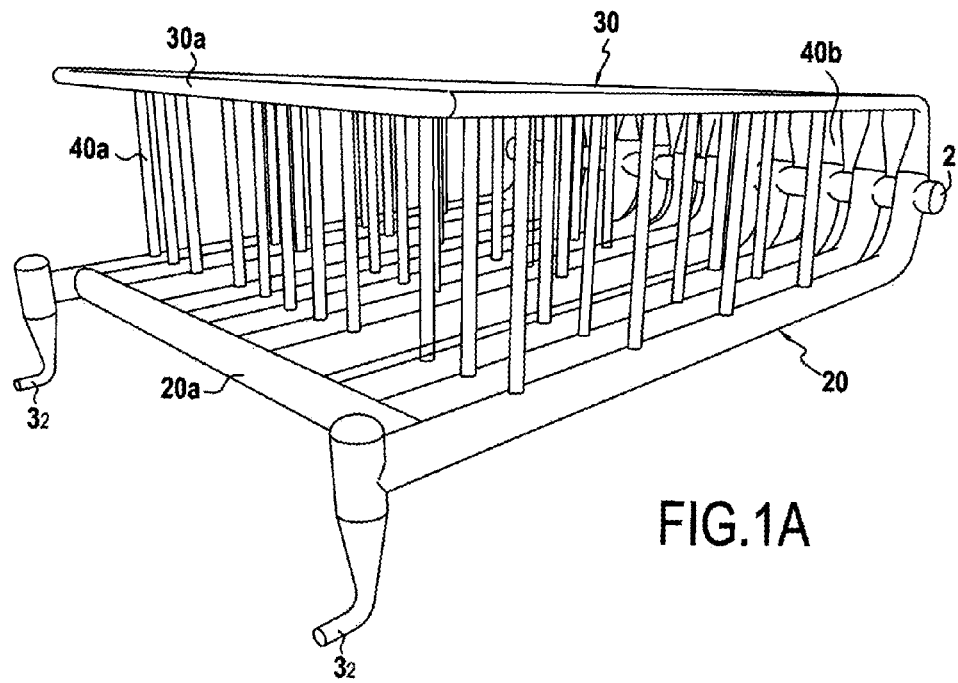
FIGS. 1A and 1B are perspective views of a separator device of the invention in its support structure.
Figure 1B:
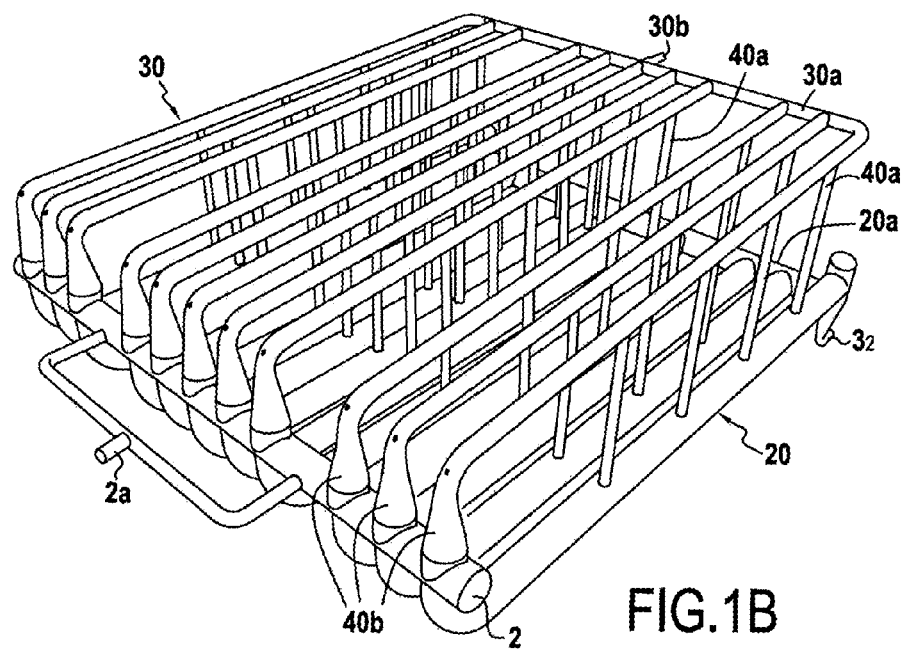
Figure 2A:
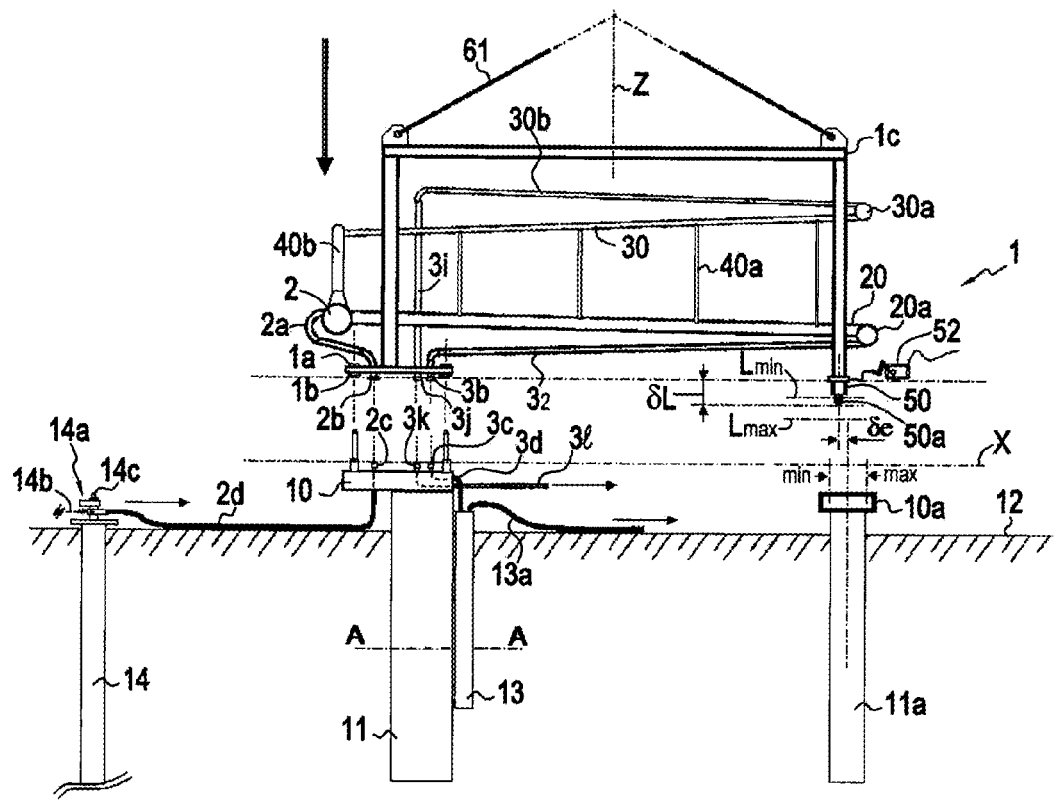
FIGS. 2A and 2B are side views of a horizontal undersea separator device of the invention while it is being lowered (FIG. 2A) and fastened (FIG. 2B) to its base secured to main suction anchor installed on the sea bottom, and its secondary bearing points secured to secondary suction anchors, horizontal FIG. 2B showing the path followed by oil when degassing and the path followed by gas.

FIG. 2A shows an undersea liquid/gas separator device 1 of the invention being lowered from the surface by means of a cable (not shown) towards a first base 10 resting on the sea bottom and secured to a main suction anchor 11 engaged in the sea bottom 12.

The first base 10 is placed close to an oil well 14 fitted with a well head 14a that is connected by a crude oil delivery pipe 2d conveying crude oil from the well head to said base.

The undersea separator of the invention comprises:

first pipes 20 for conveying oil and for returning gas, presenting a downward slope of angle α in the XZ plane;

said first pipes being connected upstream to a substantially horizontal cylindrical first diffuser tank 2, said tank being fed with crude oil by the feed pipe 2a;

said first pipes being connected downstream to a first substantially horizontal cylindrical manifold 20a, said first manifold being connected to a first evacuation pipe $3_2$ sloping towards the base 1a;

second pipes 30 for conveying gas and for returning oil, presenting a slope of angle β in the XZ plane;

said second pipes being connected upstream to said first substantially horizontal tank 2 via link pipes 40b that are preferably substantially vertical;

said second pipes being connected downstream to a second substantially horizontal cylindrical manifold 30a, said second manifold being connected to a first gas evacuation pipe 30b presenting an upward slope of angle γ, itself connected to a second gas separator pipe 3i secured to the base 1a; and third pipes 40a for conveying gas upwards and for returning degassed oil downwards connecting together said first and second pipes.

Said first pipes 20 are preferably all identical in terms of diameter, length, and mode of connection upstream to the first tank 2 and downstream to the first manifold 20a. Because they need to be capable of withstanding implosion under the considerable pressures of great depth, they are advantageously of limited diameter, since the thickness required is directly proportional to the diameter of said pipe. Thus, the diameters of the first pipes lie in the range 0.5 m to 1.5 m, thus requiring wall thickness of 25 mm to 150 mm depending on the depth at which the separator device is installed.

In the same manner, said second pipes 30 are preferably all identical in terms of diameter, length, and mode of connection, upstream to the first tank 2 and downstream to the second downstream manifold 30a, the lengths, diameters and thicknesses of the second pipes being similar to those of the first pipes.

Said third pipes 40a are preferably all identical in terms of diameter, and of mode of connection, at their top ends to the second pipes 30 and at their bottom ends to the first pipes 20. Said third pipes constitute return pipes for returning degassed oil towards the first pipes 20, and pipes for conveying gas towards the second pipes 30, and they are advantageously disposed at small, optionally regular intervals, e.g. once every three-fourths of a meter, so as to improve exchanges and thus the quality of separation between the oil and the gas. They are much smaller in diameter, lying in the range 75 mm to 150 mm.

Figure 2C:
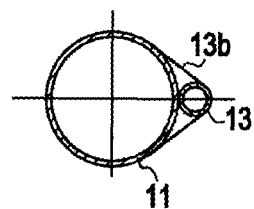
FIG. 2C is a section view of the main suction anchor on plane AA of FIG. 1.
Figure 2B:
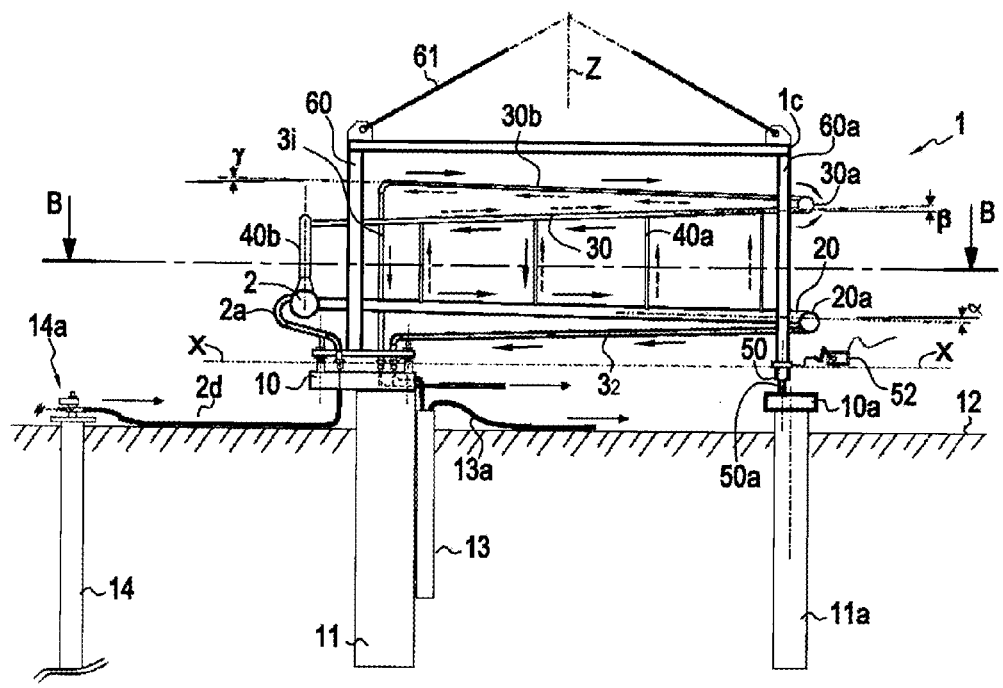
Figure 4:
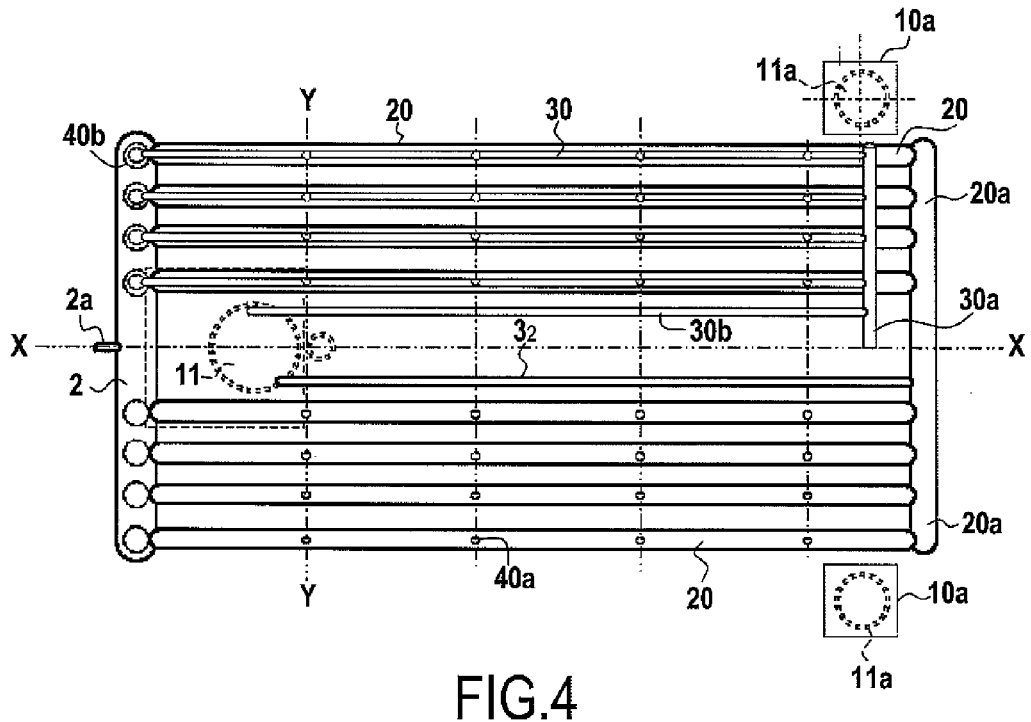
FIG. 4 is a plan view partially in section on plane BB of FIG. 2.

In FIGS. 2A, 2B, and 4, there can be seen eight first pipes 20, eight second pipes 30, with each of the first-and-second pipe pairs being interconnected via four third pipes 40a spaced apart in substantially uniform manner. Nevertheless, the number of second pipes 30 could be smaller than the number of first pipes 20, and under such circumstances, each of the first pipes is connected to at least one second pipe so that the gas can be conveyed upwards, it being possible for a plurality of first pipes to be connected to a single second pipe.

The separator device 1 comprises a main structure 1c supporting all of the pipes, and in its bottom portion, preferably beside the first upstream diffuser tank 2, a frame 1a in the form of a platform having four perforations fitted with four bubble-shaped guides 1b that co-operate with corresponding posts 60 secured to the base 10 and projecting vertically thereabove, so that when the device is lowered towards the base 10, at the end of its descent, the female portions 2b-3b-3j of a series of automatic connectors situated beneath said frame co-operate with the complementary male portions 2c-3c-3k of automatic connectors disposed on said base.

Said first diffuser tank 2 includes an oil feed pipe 2a having the female portion 2b of an automatic connector at the end thereof under said frame 1a suitable for co-operating with the complementary male portion 2c of the automatic connector on said base 10, at the end of said crude fluid delivery pipe 2d.

The second manifold 30a is connected to the first gas evacuation pipe 30b sloping upwards at an angle .gamma., which pipe is connected to the second gas separator pipe 3i having its bottom end secured to the underside of said frame 1a and including the female portion 3j of an automatic connector that co-operates with the complementary male portion 3k of the automatic connector secured to said base 10 when the separation device is fastened on said base.

Said male portion 3k on said base is fastened to the end of a second gas evacuation pipe 3l.

Crude oil under high pressure, e.g. 100 bars to 200 bars, or even more, comes from the well 14 surmounted by the well head 14a fitted with a choke type pressure-reducer device 14b and with an automatic flow rate control valve 14c that is controlled from the surface and connected to an oil delivery pipe 2d, and the crude oil that is conveyed thereby at reduced pressure, e.g. at 20 bars, to the undersea separator 1.

FIG. 2B shows the crossed paths of the oil being degassed and of the gas. The path followed by the oil liquid phase is drawn with continuous lines and the path followed by the gaseous phase is drawn with dotted lines.

Figure 3:
FIG. 3 is a section view of the first tank or first manifold with liquid and gaseous phases.

The crude oil penetrates into the first diffuser tank 2 and the stream of oil pours in shared manner into said pipes 20 of gentle downward slope at an angle .alpha., e.g. of 0.5 degrees to 5 degrees, and preferably at an angle lying in the range 2 degrees to 4 degrees. The oil then flows slowly towards the first manifold 20a and fills only the bottom portions of said first pipes 20 and of the first manifold 20a, as shown in FIG. 3, thus enabling the gas to separate from the liquid phase, said gaseous phase then flowing in the opposite direction in the top portions of said first pipes 20 so as to pass via the third pipes 40a to the second gas pipes 30. FIG. 3 also shows the gas separating from condensates in the form of drops that then fall back merely under gravity into the stream of degassed oil flowing from left to right, the gas flowing from right to left and rising towards the second pipe 30 via the substantially vertical third pipes 40a.

In the upper half of FIG. 4 there can be seen a plan view associated with FIG. 2B, and in its lower half a section view from above on plane BE of FIG. 2B. Thus, each of said first pipes 20 is associated with a said second pipe 30, said pipes being interconnected by four third pipes 40a.

For clarity in the drawings, the second pipes 30 are shown as being smaller in diameter than the first pipes 20 for oil, however depending on the gas content of the crude oil, since said second pipes 30 convey mainly gas, it may be necessary for them to be of a diameter that is greater than or less than the diameter of said first pipes for oil. Similarly, one said second pipe 30 is shown associated with each first pipe 20, however in order to limit metalwork, it is advantageous to associate one said second pipe 30 with a group of two, three, or even more first pipes 20, each of said second pipes 30 being directly or indirectly connected to each of said first pipes 20 of a given group, so that gas can be conveyed upwards and oil can return downwards without impediment.

The first diffuser tank 2 presents a large diameter, e.g. 1 m, and it extends across the width of the separator, e.g. over 6 m to 15 m, so as to damp the phenomenon associated with "slugs" that correspond to the sudden arrival of large pockets of gas via the bottom pipe 2a or to slugs of oil between two pockets of gas.

These phenomena are very violent and completely disturb the separation process, since a large fraction of the crude oil in the zone of the plane BB is then thrown suddenly upwards from said first tank.

These disturbances then produce after-effects in each of the first pipes 20 to a greater or lesser extent, however, the great length of said first pipes, e.g. lying in the range 20 m to 30 m, limits the destabilizing effects of these slugs in the zone close to the first manifold 20a.

The degassed crude oil is recovered from the bottom portion via the first manifold 20a directing the fluid towards a first pipe 3d for evacuating the degassed fluid. This pipe feeds the underwater export pump 13c housed in a well 13 adjacent to the suction anchor 11 and secured thereto by gussets 13b that are shown in FIG. 2C but not in the other figures.

At the outlet from the export pump, the degassed crude oil is sent via a second pipe element 13a for evacuating degassed fluid either to a support floating on the surface, or to a secondary water-oil separator so that only oil is sent to the surface, the water being either reinjected into a well similar to the well 14, or else merely released into the sea, providing it is of acceptable cleanness, i.e. providing it has a sufficiently small quantity of residual particles of crude oil.

In the same manner, the gas separated in the high portion is collected in the second manifold 30a and is then sent by the gas evacuation pipe 3l either to the surface, or else to be recompressed and then reinjected into a well (not shown) similar to the well 14.

In order to avoid the need to recompress the gas before sending it to the surface, the operating pressure of the undersea separator, i.e. the pressure P1 inside said tank, is advantageously adjusted to a pressure that is considerably greater than the head loss in said gas pipe, e.g. an operating pressure of 20 bars, whereas the head loss is no more than 3 bars over the full length of the pipe 3l rising to the surface and at the maximum flow rate of the gas. Nevertheless, in order to ensure that the oil degasses under good conditions, the pressure P1 that is used is not very high relative to the pressure of the well head.

Figure 5:
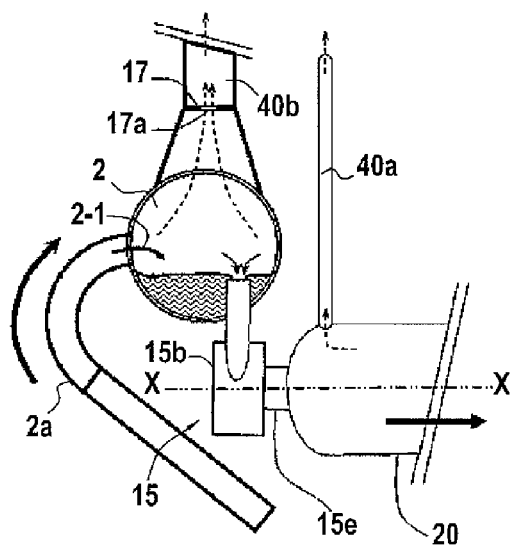
FIG. 5 shows a controlled head loss device.
Figure 5A:
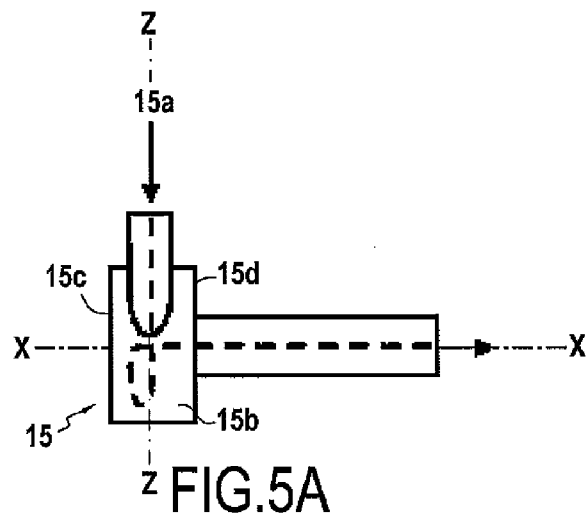
FIG. 5A is a side view looking along YY showing the path followed by fluid within said FIG. 5 controlled head loss device.
Figure 5B:
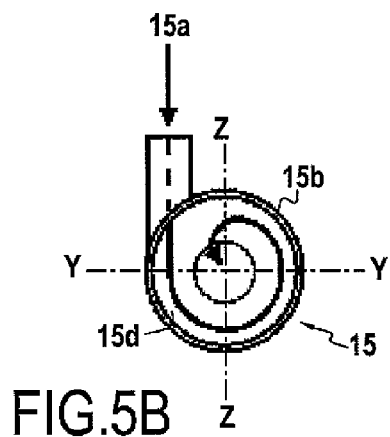
FIG. 5B is a side view looking along XX showing the path of the fluid within said FIG. 5 controlled loss head device.

FIGS. 5, 5A, and 5B are section views and a side view of a preferred disposition for the connection between the first pipe 20 and the first diffuser tank 2, with said first pipe 20 being connected at its upstream end to an additional device 15 of the cyclone type for the purpose of creating additional head loss in the event of the flow rate increasing significantly. For this purpose, the cyclone type device 15 is constituted by an enclosure comprising a cylindrical wall 15b of axis parallel to the axis of the first pipe 20, preferably concentric with said first pipe 20, and of diameter that preferably lies in the 5% to 25% of the diameter of said pipe 20.

The cylindrical wall 15b of the enclosure is closed and made leaktight at its ends via opposite faces 15c-15d. One of these two faces, the face 15d is connected by a small diameter segment of pipe 15e to the end of said first pipe 20. The diameter of said segment 15 preferably lies in the range 10% to 50% of the diameter of the cylindrical wall 15b.

The cylindrical wall 15b of the device 15 possesses a tubular branch 15a enabling crude oil to enter tangentially against the inside surface of said cylindrical wall 15b in a direction that is substantially parallel to the axial direction ZZ of said third vertical pipes 40a.

In normal and regular operation, the flow of crude oil remains substantially in the axial XY plane of the pipe 15e sloping at an angle α relative to the horizontal, and the device 15 does not modify the operation of the system. In the event of flow rate increasing suddenly, or of the system becoming unstable on the arrival of a "slug", the flow through the device becomes suddenly turbulent as represented in FIG. 5B, thereby increasing a large amount of head loss and thus reducing the extent to which the temporary instability of the process is transmitted to the first pipe 20.

FIG. 5 shows the delivery of the feed pipes 2a via orifices 2-1 in the tank 2, each orifice 2-1 being disposed substantially at half-height of said tank. The top portion of said first tank, above the orifices 2-1 creates an empty volume filled with gas that makes it possible to damp and thus to control projected splashes of fluid that can arise when certain pockets of gas ("slugs") penetrate into the bottom end of said first tank and expand suddenly, thereby violently projecting liquid inside said first tank.

In the bottom portion of the vertical pipe 40b, there is advantageously a diaphragm 17 presenting an orifice 17a of small diameter, e.g. 75 mm, so that the violent effects of a slug are limited to the diffuser tank 2 and lead to minimum disturbance of the upward conveyance of gas.

Figure 5C:
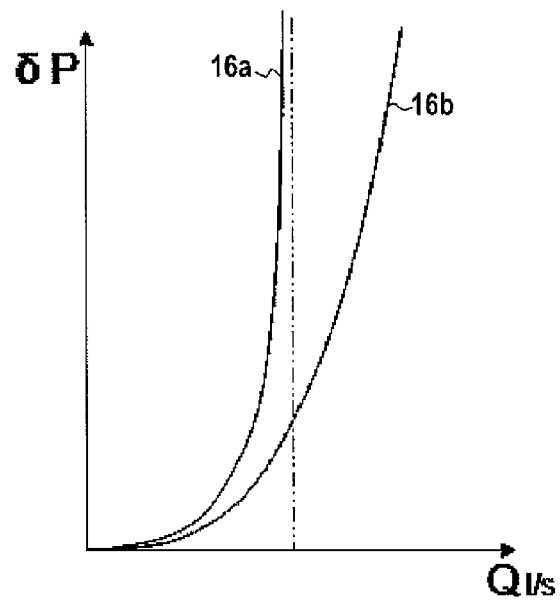
FIG. 5C is a graph showing head losses respectively in a device in the disposition of FIG. 2B and in the FIG. 5 controlled head loss device.

The effect of these head loss devices 15 and 17 is shown in the graph of FIG. 5C where head loss is plotted up the ordinate and fluid flow rate is plotted along the abscissa.

When the pipe 20 is directly connected to the first tank, head loss is very low and a slug significantly disturbs the separation process all along the first pipe 20. In the graph of FIG. 5C, the curve 16b plotting head losses is substantially parabolic and represents the head loss of the device 17, which significantly attenuates the disturbance from the slug towards the vertical pipe 40b, and the device 15 presents head loss that corresponds to the curve 16a. Its head loss remains substantially parabolic at low flow rates, however it increases asymptotically at high flow rates, thus enabling the disturbance generated by the slug to be filtered radially, the slug then remaining confined in the first diffuser tank 2 and as a result hardly being transmitted at all into the first separator pipe 20. In addition, this head loss has the effect of optimizing the way the disturbance is shared between the various first separator pipes 20.

Since the device is installed at great depth, the temperature of the sea water lies in the range 3° C. to 5° C., and in order to avoid paraffin in the crude oil freezing or hydrates forming, which would create generalized blockages that are difficult and sometimes even impossible to eliminate, each of the elements between the outlet from the well 14 and the surface or the reinjection well is preferably insulated.

For this purpose, an insulating enclosure 27 is advantageously installed completely surrounding the tanks and the base 10 of the undersea separator, the enclosure 27 being stiffened by a metal or composite structure, for example, and including internal lagging 27a that may be a syntactic foam, an insulating gel, or any other insulation system compatible with the pressure at the sea bottom, which pressure is substantially 100 bars, i.e. substantially 10 MPa per thousand meters of water depth.

Each of the components of the undersea separator could be insulated separately, i.e. each of the various pipes could be insulated separately, however the high portion above the plane BB generally contains the gaseous phase only so the risks of cold points therein are greatly increased. By creating a lagged internal volume, the sea water contained inside said volume is permanently at substantially the same temperature T1 as the crude oil entering via 2d. Internal convection currents in the volume continually stir said volume, thereby maintaining a substantially constant temperature within the undersea separator throughout the duration of the process, which separator may be of a height that exceeds 5 m, e.g. lying in the range 5 m to 15 m, and maintains a constant temperature more particularly in the high portion of said separator, which is almost continuously filled with gas.

In order to limit transfers of heat in the bottom portion, additional insulation is advantageously provided at the base 10.

A bottom orifice of the enclosure 27 (not shown) advantageously puts the inside volume into communication with the surrounding medium so as to avoid pressure variations due to expansion, but said communication is of small diameter, e.g. 50 mm, so as to avoid undesirable convection phenomena.

Figure 6:
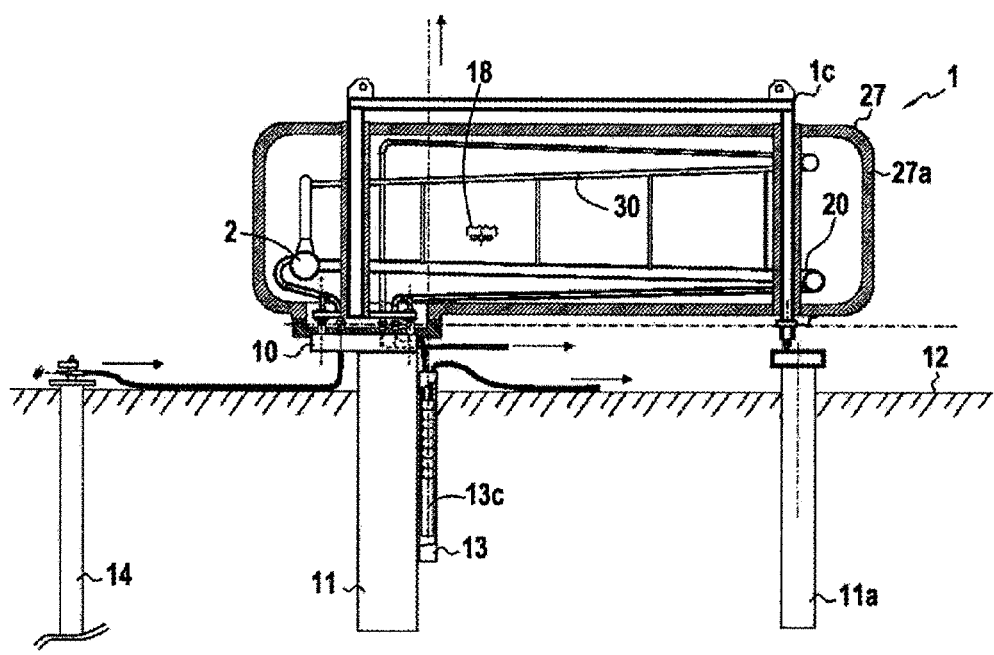
FIG. 6 is a side view of an undersea separator installed on its base, fitted with an insulating bell and with heater means.

As shown in FIG. 6, a water preheater/heater device 18 is advantageously placed inside the insulating enclosure 27 so as to maintain the volume of sea water therein at a temperature that is high enough to avoid plugs of paraffin or hydrates forming during starting stages, a prolonged pause, or stages of production at a low rate. The heater device may be electrical, or it may comprise a circulating fluid loop e.g. taken from the production crude oil passing through a non-lagged coil within said volume of sea water inside the lagged enclosure. To clarify explanations, said preheater/heater and stirring device 18 is shown at half-height inside the enclosure 27, but it is advantageously installed in its bottom portion, preferably level with the main base. Great care is taken to insulate the elements of the carrier structure 1c properly so as to minimize heat losses.

FIG. 6 also shows the export pump 13c installed in its well 13 and that can advantageously be extracted vertically through an insulated well (not shown) without it being necessary to dismantle the undersea separator, so that it can be subjected to maintenance on the surface.

The pump well 13 is secured to the suction anchor, so it is thus installed at the same time as said suction anchor 11 and in a geometrical position that is known relative to the base 10 for supporting the undersea separator 1.

This particular disposition of the pump 13c that is installed at several meters or even several tens of meters below the separator advantageously improves the boosting of said pump 13c and thus makes its operation more reliable and increases its lifetime.

The device of the invention requires great accuracy while it is being installed so that the angle $\alpha$ is as close as possible to the specifications for the system. For this purpose, the module is advantageously placed on a main suction anchor 11 of great bearing capacity, e.g. having a diameter of 5 m, together with two secondary suction anchors 11a of smaller bearing capacity, e.g. having a diameter of 2.5 m. The main suction anchor has all of the above-described guidance and connection elements, whereas the secondary suction anchors 11a serve merely as bearing points, and by the size of their top portions that are preferably plane, as shown in FIG. 2A, they enable the axis of the pillars 60a of the structure 1c to be offset by an amount 8e relative to the axis of said secondary suction anchor or pile 11a. By proceeding in this way, the positioning of the secondary suction anchors 11a does not require great accuracy relative to each other, nor relative to the main suction anchor 11, thus greatly facilitating installation thereof in depths of 1500 m to 2000 m, or even more.

In FIGS. 2A and 2B, the pillars of the structure 1c present respective mechanical or hydraulic actuators 50 facing the secondary suction anchors, which actuators have rods 50a in contact with the preferably plane top portion of the secondary suction anchor 11a. The actuators 50 are actuated by means of the automatic undersea robot ROV 52 that is controlled from the surface so as to modify the trim of the module on its three bearing points by acting on the lengths of the outlet rods 50a.

Thus, the separator device is lowered from the surface using cables 61 and is merely placed on the three bases 10, 10a of the three suction anchors 11, 11a. Thereafter, initially the parallelism of the axis of the diffuser 2 and thus of the manifolds 20a-30a is adjusted relative to the horizontal axis YY that is perpendicular to the figure, by actuating at least one of the actuators 50 with the help of the ROV, the angle of inclination being delivered to the surface by means of an inclinometer (not shown) directly installed on the separator module. Finally, the angle $\alpha$ is adjusted to a very accurate value compared with the specifications, by actuating the rods of the two actuators 50 by the same amount in the same direction. The actuators present a stroke that is such that it is possible to compensate for variations in the vertical positioning of the suction anchors, e.g. 0.5 m, corresponding to $\delta L = Lmax - Lmin$, as shown in FIG. 2. Thus, there is no need for all three suction anchors to be buried to exactly the same depth, in order to be able to adjust the horizontality of the axes of the diffuser 2 and of the manifolds 20a-30a with very great accuracy, and thus adjust the value of the angle $\alpha$, which remains a parameter that is extremely sensitive for the undersea separator device. If a secondary suction anchor should be buried too deeply, or should become unstable over time, then a spacer can advantageously be interposed, e.g. a spacer having a thickness of 25 centimeters (cm) between the end of the actuator rod and the plane top portion of the secondary suction anchor.

The device for adjusting the horizontality and the angle $\alpha$ with the help of actuators 50-51 actuated with the help of an ROV makes it possible to perform maintenance operations, or indeed to change said angle $\alpha$, i.e. increase it or reduce it, so as to modify the operating point of said separator, e.g. as a function of large variations over time in the ratio of gas or the percentage of water in the crude oil. Nevertheless, care should be taken to define a range over which the angle $\alpha$ is varied that is compatible with the angles $\beta$ and $\gamma$, so that no undesirable reverse slope appears in the second pipes or in the gas evacuation pipe 30b.

By way of example, a horizontal separator of the invention presents a separation capacity of 50,000 barrels of oil per day, i.e. 333.3 cubic meters per hour ($m^3/h$) of crude oil with a gas/oil ratio (GOR) of 50, i.e. 50 normalized cubic meters ($Nm^3$) of gas per cubic meter ($m^3$) of crude oil and with a water content that may lie in the range zero to 90%. It is constituted by 12 first pipes 20 for oil with an inside diameter of 750 mm and a length of 14 m, three second pipes 30 for gas with an inside diameter of 500 mm and a length of 14 m, and three vertical link pipes 40a with an inside diameter of 150 mm and a length of about 3 mm, connecting each of the second pipes 30 for gas to a set of four first pipes 20 for oil, thus enabling gas to be conveyed upwards and condensates to be returned downwards. When a field begins to be worked, the crude oil contains little water and presents a high level of viscosity, so the slope $\alpha$ of the first pipe is then adjusted to a value of 8°, the slope $\beta$ of the second pipe is 4°, and the slope $\gamma$ of the gas return line 30b is 10°. The separator device is about 18 m long, 12 m wide, and about 6 m high. Its weight in air is 180 metric tonnes, including 80 tonnes for the supporting structure 1c. The main suction anchor 11 has a diameter of 5 m and a total length of 25 m, the secondary suction anchors 11a have a diameter of 2 m and a total length of 15 m. At the end of working, the viscosity of the crude oil is smaller because it has a much greater water content: by using an ROV to act on the actuators 50, the slope $\alpha$ of the first pipe is then reduced to 2° so as to slow down the advance of oil for degassing along said first pipes. The slope $\beta$ of the second pipes is then 10° and the slope $\gamma$ of the gas return line is 4°, thereby ensuring that condensates are returned merely by gravity towards the first pipes.

The invention claimed is:

1. An undersea liquid/gas separator device for separating liquid and gaseous phases of a fluid, in particular liquid and gaseous phases of crude oil, wherein the device comprises a structure resting on the sea bottom and supporting:
    a) a plurality of first separator pipes extending from a horizontally-extending cylindrical first tank of elongate shape and circular section, the first separator pipes being connected thereto at their upstream ends, said first separator pipes being inclined at an angle $\alpha$ lying in the range 1° to 5° relative to the horizontal with a gentle downward slope from said first tank towards a substantially horizontal first cylindrical manifold to which said first pipes are connected downstream, said first tank being fed by at least one fluid feed pipe, and said first manifold being connected to a first liquid evacuation pipe of downward slope;
    b) a plurality of second separator pipes disposed above said first pipes from and above said first tank with a gentle rising slope from said first tank towards a substantially horizontal second cylindrical manifold, said second separator pipes being inclined relative to the horizontal at an angle $\beta$ greater than $\alpha$, said second manifold being connected to a first gas evacuation pipe;
    c) a plurality of vertical link third pipes between each said first separator pipe and each said second separator pipe; and
    d) a system of actuators enabling the inclination of said first and second separator pipes to be adjusted accurately and enabling said first tank and said first and second manifolds to be positioned horizontally.

2. The device according to claim 1, wherein said first gas evacuation pipe slopes upwards from said second manifold to the end of a second gas evacuation pipe, said first gas evacuation pipe being inclined at an angle $\gamma$ that is greater than $\alpha$.

3. The device according to claim 1, wherein said second separator pipes are connected upstream to said first tank via a respective plurality of second link pipes of slope that is greater than the slope of said second separator pipes.

4. The device according to claim 1, wherein said first tank and said first and second manifolds are substantially parallel, and said first and second separator pipes extend substantially in the same direction that is substantially perpendicular to the longitudinal direction of said first tank and said first and second manifolds.

5. The device according to claim 1, including flow rate control devices downstream from said first tank at the upstream ends of said first separator pipes, said devices controlling the flow rate of fluid transfer by head loss.

6. The device according to claim 1, wherein the device comprises a structure constituted by a frame of beams supporting said first and second pipes, said first tank, and said first and second manifolds, said structure comprising:
    at least a first vertical pillar having a first frame at its bottom end, the first frame supporting portions of automatic connectors connected to said fluid feed pipe, to said first fluid evacuation pipe, and to a second gas evacuation pipe, said frame being suitable for co-operating in fastening with and on a first base anchored to the sea bottom; and
    at least two second vertical pillars each fitted at its bottom end with an actuator, the at least two actuators being suitable for co-operating with second bases anchored to the sea bottom and supporting them, said second pillars being disposed in such a manner as to enable the inclination of said first and second separator pipes and of said first gas evacuation pipe to be adjusted and varied by actuating said actuators.

7. The device according to claim 1, that is installed at the sea bottom and includes a fluid delivery pipe providing a connection between at least one head of an oil well and said fluid feed pipe connected to said first tank at its other end, and including a pressure-reducer device.

8. The device according to claim 6 that is installed at the sea bottom, that includes a fluid delivery pipe providing a connection between at least one head of an oil well and said fluid feed pipe connected to said first tank at its other end, and including a pressure-reducer device and a fluid flow rate control valve upstream from said delivery pipe for said fluid, and that is connected to a first base anchored to the sea bottom, said first base supporting a series of male or female portions of automatic connectors respectively at the ends of said first fluid delivery pipe, of a second degassed liquid evacuation pipe, and of a third gas evacuation pipe, co-operating with the complementary female or male portions respectively of the automatic connectors connected to said fluid feed pipe, to said first liquid evacuation pipe, and to said gas evacuation pipe.

9. The device according to claim 5, wherein a second fluid evacuation pipe co-operates with a export pump inserted in a well buried in the sea bottom beside a suction anchor of a first base anchored to the sea bottom.

10. The device according to claim 1, wherein said first tank, said first and second manifolds, and said first, second, and third pipes are thermally insulated by a common rigid thermal-insulation enclosure filled with sea water and in communication with the sea via at least one communication orifice.

11. The device according to claim 1, comprising:
pluralities of 3 to 20 of said first and second separator pipes and respectively of said link third pipes; and
a single said fluid feed pipe, a single said first liquid evacuation pipe, and a single said first gas evacuation pipe.

12. A method of separating liquid and gaseous phases of a fluid using a structure resting on the sea bottom and supporting
a) a plurality of first separator pipes extending from a horizontally-extending cylindrical first tank of elongate shape and circular section, the first separator pipes being connected thereto at their upstream ends, said first separator pipes being inclined at an angle α lying in the range 1° to 5° relative to the horizontal with a gentle downward slope from said first tank towards a substantially horizontal first cylindrical manifold to which said first pipes are connected downstream, said first tank being fed by at least one fluid feed pipe, and said first manifold being connected to a first liquid evacuation pipe of downward slope;
b) a plurality of second separator pipes disposed above said first pipes from and above said first tank with a gentle rising slope from said first tank towards a substantially horizontal second cylindrical manifold, said second separator pipes being inclined relative to the horizontal at an angle β greater than α, said second manifold connected to a first gas evacuation pipe;
c) a plurality of vertical link third pipes between each said first separator pipe and each said second separator pipe; and
d) a system of actuators enabling the inclination of said first and second separator pipes to be adjusted accurately and enabling said first tank and said first and second manifolds to be positioned horizontally;

wherein the following steps are performed:
1) sending the fluid via a fluid feed pipe to said first tank;
2) allowing the at least partially degassed liquid to flow from said first tank via said first separator pipe in order to be further degassed and to move down towards said first manifold, and then to said first liquid evacuation pipe;
3) allowing the gaseous phase to rise and flow via said second separator pipes towards said second manifold, and then towards said first gas evacuation pipe in order to allow additional separation of any residual liquid contained in the gaseous phase prior to being evacuated via a second evacuation pipe;
4) allowing the gas phase from the first separator pipe to rise through said vertical link third pipes and flow via said second separator pipes towards said second manifold and then towards said first gas evacuation pipe and a second gas evacuation pipe;
5) allowing the liquid coming from gas separation in said second separator pipes, said second manifold, and said first gas evacuation pipe to flow towards said first manifold by passing via said first tank or said vertical link third pipes prior to rejoining said first liquid evacuation pipe;
6) recovering the substantially degassed liquid phase from the bottom end of said first liquid evacuation pipe and taking it via a second liquid evacuation pipe that is taken to the surface or sent to a liquid separator device in order to separate the different liquids possibly contained therein; and
7) recovering the gas phase substantially separated from said liquid from the bottom end of said second gas evacuation pipe.

13. The method according to claim 12, wherein said crude oil is sent at the bottom end of said first tank at a reduced pressure P1, less than the static pressure P2 at the sea bottom, where P0 is the pressure at the surface, is greater than the head losses in the second gas evacuation pipes from the sea bottom to the surface.

14. The method according to claim 12, wherein the liquid of the degassed fluid is exported from the sea bottom to the surface with the help of said export pump.

15. The method according to claim 12, wherein the delivery flow rate of the fluid is controlled upstream from a first tank by a flow rate control valve, or the evacuation flow rate of the degassed fluid is controlled downstream from said first manifold by the speed of said export pump as a function of measurements from at least one device for monitoring the level of the fluid within at least said first manifold.

16. The method according to claim 12, wherein said separator device is installed on the sea bottom at a depth lying in the range 100 m to 4000 m, and a pressure P2 lying in the range 10 bars to 50 bars, within said first tank and said first and second manifolds and said first and second separator pipes and said link third pipes by lowering the pressure by means of a pressure-reducer device co-operating with a fluid delivery pipe upstream from said first tank.

17. A method of placing a separator device on the sea bottom, the device for separating liquid and gaseous phases of a fluid, wherein the device comprises a structure resting on the sea bottom and supporting:
a) a plurality of first separator pipes extending from a horizontally-extending cylindrical first tank of elongate shape and circular section, the first separator pipes being connected thereto at their upstream ends, said first separator pipes being inclined at an angle α lying in the range 1° to 5° relative to the horizontal with a gentle downward slope from said first tank towards a substantially horizontal first cylindrical manifold to which said first pipes are connected downstream, said first tank being fed by at least one fluid feed pipe, and said first manifold being connected to a first liquid evacuation pipe of downward slope;

b) a plurality of second separator pipes disposed above said first pipes from and above said first tank with a gentle rising slope from said first tank towards a substantially horizontal second cylindrical manifold, said second separator pipes being inclined relative to the horizontal at an angle β greater than α, said second manifold being connected to a first gas evacuation pipe;

c) a plurality of vertical link third pipes between each said first separator pipe and each said second separator pipe; and d) a system of actuators enabling the inclination of said first and second separator pipes to be adjusted accurately and enabling said first tank and said first and second manifolds to be positioned horizontally;

wherein the following steps are performed:
1) lowering said separator device from the surface and placing it on the sea bottom; and
2) adjusting the horizontality of said first tank and of said first and second manifolds, and the inclination of said first and second separator pipes by actuating said system of actuators.

18. The method according to claim 17, wherein the device comprises a structure constituted by a frame of beams supporting said first and second pipes, said first tank, and said first and second manifolds, said structure comprising:

at least a first vertical pillar having a first frame at its bottom end, the first frame supporting portions of automatic connectors connected to said fluid feed pipe, to said first fluid evacuation pipe, and to said second gas evacuation pipe, said frame being suitable for co-operating in fastening with and on a first base anchored to the sea bottom; and at least two second vertical pillars each fitted at its bottom end with a actuator, the at least two actuators being suitable for co-operating with second bases anchored to the sea bottom and supporting them, said second pillars being disposed in such a manner as to enable the inclination of said first and second separator pipes and of said first gas evacuation pipe to be adjusted and varied by actuating said actuators; and wherein the following steps are performed:
a) said separator device is lowered from the surface and placed on three bases constituted by three suction anchors buried in the sea bottom; then
b) the horizontality of the axes of said first diffuser tank and of said first and second manifolds are adjusted relative to the horizontal by actuating at least one of the actuators by means of an ROV; and then
c) the inclinations of said first and second separator pipes are adjusted by actuating the rods of two actuators by the same amount in the same direction.

* * * * *